Aug. 4, 1964     J. B. SCHULTZ     3,143,360
VEHICLE SUSPENSION
Filed June 30, 1960     3 Sheets-Sheet 1

INVENTOR.
JULIUS B. SCHULTZ
BY John R. Faulkner
Clifford L. Sadler
ATTORNEYS

INVENTOR.
JULIUS B. SCHULTZ 3,143,360
Patented Aug. 4, 1964

3,143,360
VEHICLE SUSPENSION
Julius B. Schultz, Detroit, Mich., assignor to Ford Motor Company, Dearborn, Mich., a corporation of Delaware
Filed June 30, 1960, Ser. No. 40,022
8 Claims. (Cl. 280—96.2)

The present invention relates to suspension systems and more particularly to an independent front suspension for motor vehicles having a suspension spring located above the wheel support member.

It is common practice in automotive vehicles to provide independent front suspensions having pivotally mounted upper and lower support arms that carry the wheel spindle. Normally, the suspension spring is interposed between one of the arms and an adjacent frame member.

A convenient location for the spring reaction member may not be readily obtainable in a unit body vehicle where the conventional side rails are absent and the frame is integrally formed of body sheet metal. In such vehicles it has been found expedient to locate a coil suspension spring above the upper support arm and interposed between it and a bracket attached to an integral frame member.

The present invention provides an improvement in independent suspension structures of the type where the upper arm is joined to the wheel spindle by a ball joint connection. More specifically, a spring seat is pivotally connected to the upper arm and holds the socket of the ball joint. Forces are transferred directly from the spindle through the ball joint and to the coil spring. The extension of a line connecting the centers of the ball joints is arranged such that it intersects the ground contact point of the tire.

The spring seat is always in line with the spindle when the wheel moves up and down and is relatively stationary when the wheel turns on cornering. This is achieved by inserting one end of a dowel pin through the ball joint socket and the other end of the pin into the top of the ball. The pin has a running fit in the ball to permit the wheel to be turned.

Further objects and advantages of the present invention will be more thoroughly understood when consideration is given to the following discussion and the accompanying drawings, in which.

Figure 1:
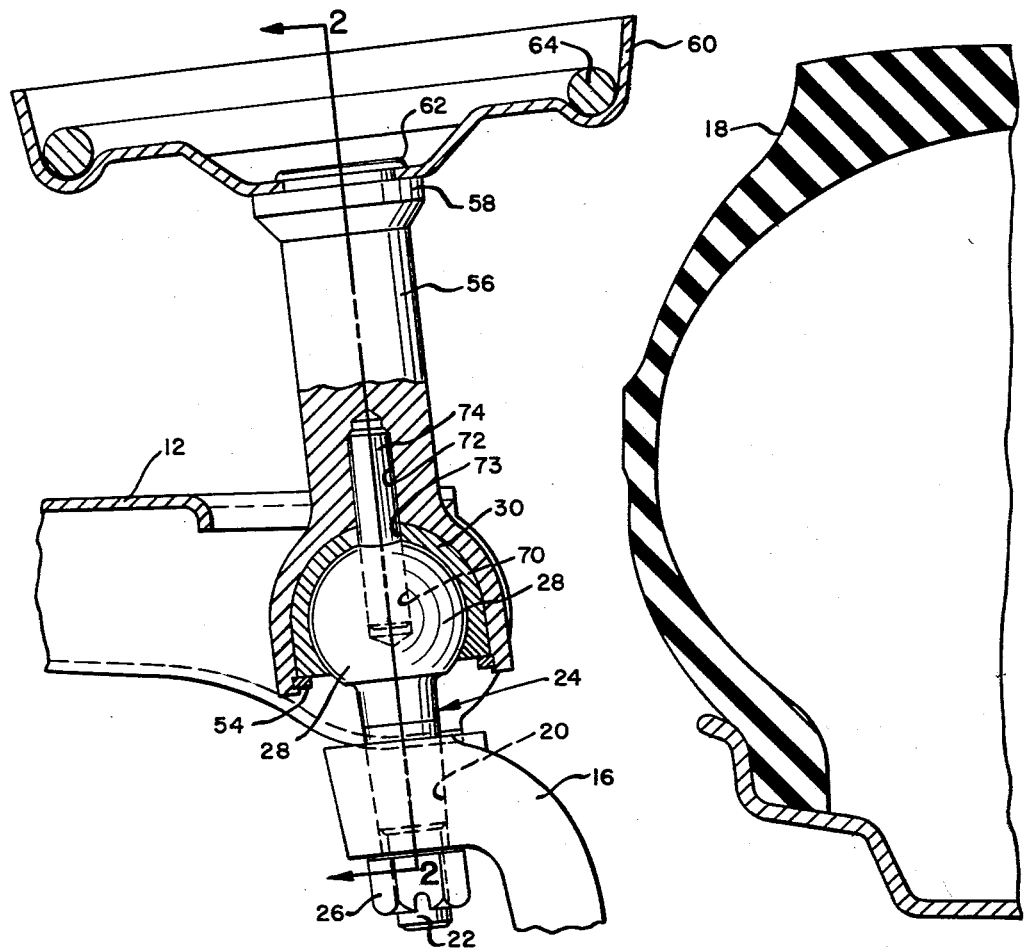
FIGURE 1 is an elevational view partly in section of the ball joint and spring seat construction of this invention.
Figure 2:
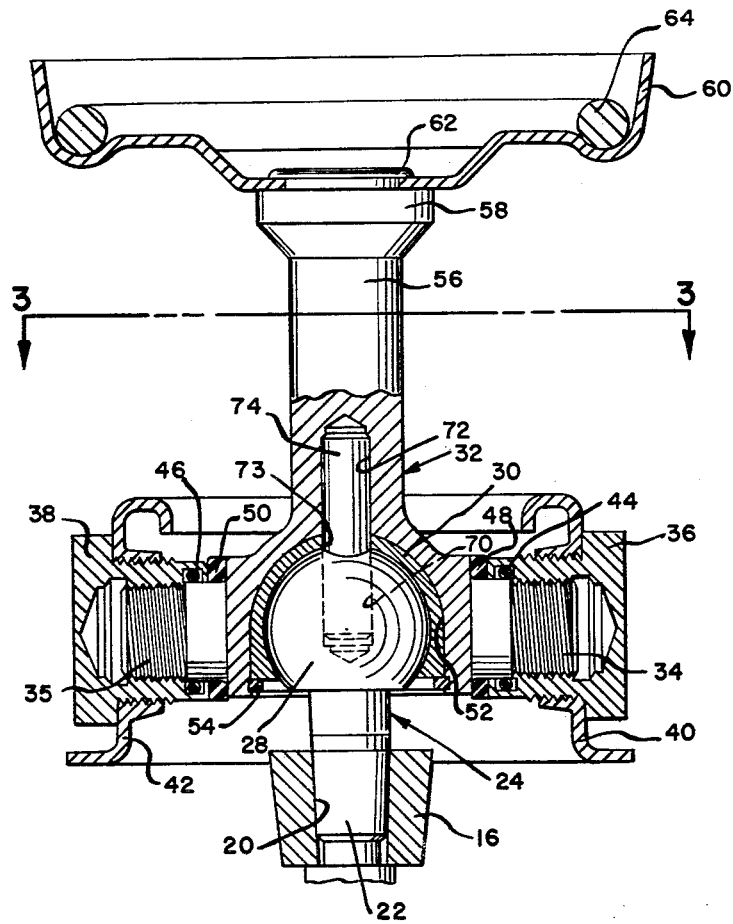
FIGURE 2 is a sectional view taken along section lines 2—2 of FIGURE 1.

Referring now to the drawings for a more detailed understanding of the present invention, wherein like reference numerals identify like parts throughout the various views, a ball joint and spring seat construction for an independent vehicle suspension is disclosed in accordance with its preferred embodiment.

The independent front suspension is shown supported on a cross frame member 10. The suspension includes an upper support arm 12 and lower support arm 14 both connected at their inner ends to frame member 10. The outer end of the lower arm 14 is joined to a wheel support spindle 16 by a ball joint of conventional constuction. A road wheel 18 is rotatably mounted on the wheel spindle 16. The upper end of the spindle 16 is universally joined to upper arm 12 by an improved joint which will now be described in detail.

The upper end of spindle 16 has a tapered bore 20 which receives the shank portion 22 of a ball headed stud 24. The shank 22 is tapered to complement the taper of the bore 20 and a nut 26 holds the stud 24 firmly in position with respect to the spindle 16. The upper end of the stud 20 is provided with a highly polished ball 28.

Figure 3:
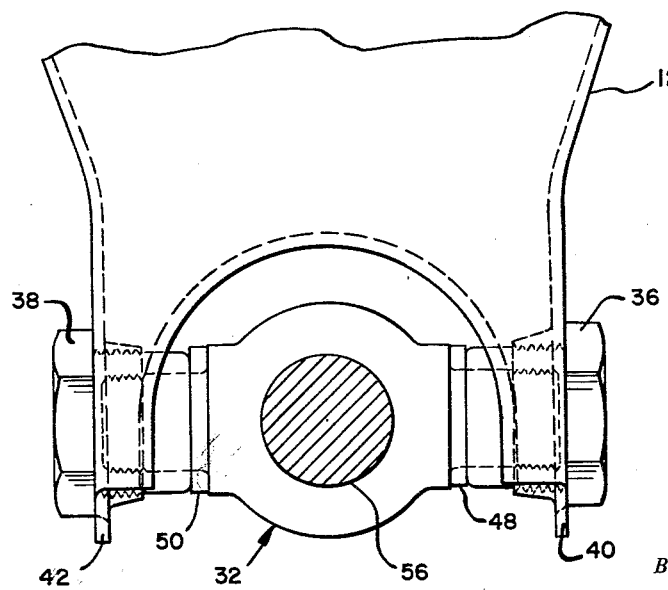
FIGURE 3 is a sectional view taken along section lines 3—3 of FIGURE 2.

A bearing piece 30 for the ball 28 is positioned in a T-shaped ball retainer and spring seat support member 32. The transverse arms 34 and 35 of member 32 threadably receive threaded bushings 36 and 38. As seen in FIGURE 3 the outer end of suspension arm 12 is provided with a yoke-like construction. The bushings 36 and 38 are threadably carried in the vertical flanges 40 and 42 of the yoke. The arms 34, 35 are sealed with respect to the busings 36, 38 by O-rings 44 and 46 and rubber washers 48 and 50. A snap ring 54 retains the bearing 30 for the ball 28 in a socket 52 formed in the T-shaped member 32.

The engagement of the threaded arms 34, 35 with the bushings 36, 38 permits the T-shaped member 32 to pivot with respect to the upper arm 12 about the axis of the bushings 36, 38.

The ball retainer and spring seat support member 32 has an upstanding shank portion 56 which terminates with an enlarged upper end 58. A pan-like spring seat 60 is fitted over the end 58. The latter member is peened over at 62 to retain the spring seat 60 in position. Coil spring 64 has one end resting in the seat 60 and its upper end bearing against a bracket 66 secured to an integral frame member 68.

The upper end of the ball 28 has a diametral bore 70 which is coaxial with the shank 22 of the stud 24. A second coaxial bore 72 is located in the shank portion 56 of the T-shaped member 32. An opening 73 in the bearing 30 is in line with the bores 70 and 72. A dowel pin 74 is press-fitted into the bore 72 and has a running fit in the bore 70 of the ball 28. Thus, the shank 22 of the stud 24 is maintained in coaxial alignment with the shank 56 of the T-shaped member 32, however, relative rotary movement is permitted between the two members about the axis of the pin 74.

Summarizing the foregoing construction and its operation, the lower spring seat is attached to an extension of the ball joint socket. In order that the center line of the spring 54 will always be in alignment with the ground contact point of wheel 18, the spring seat 60 must be maintained in alignment with the spindle 16 when the wheel 18 moves up and down and must be relatively stationary when the wheel 18 turns on cornering. This is achieved by inserting the dowel pin 74 between the ball joint socket extension 32 and the ball 28.

Figure 4:
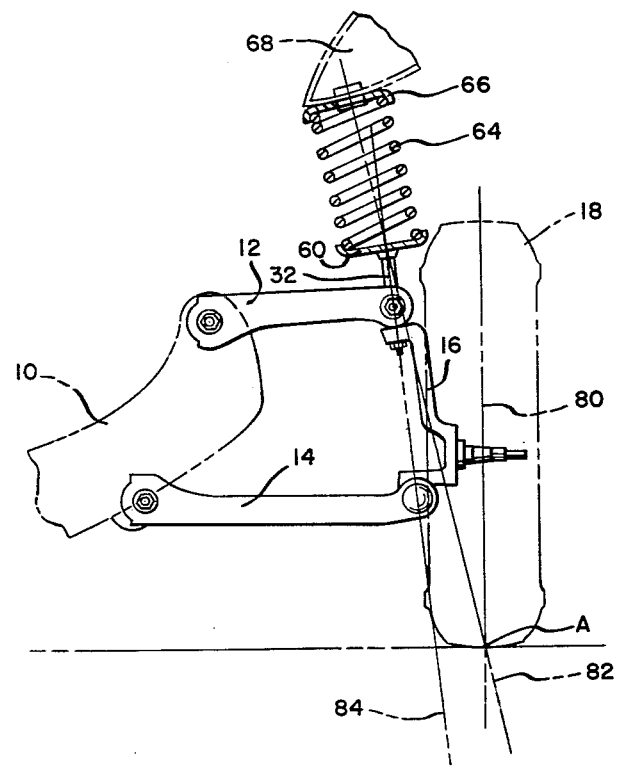
FIGURE 4 is a front elevational view showing the geometry of an independent front suspension incorporating the present invention.

As seen in FIGURE 4, wheel 18 has a vertical center line 80. The spring thrust line is indicated by the dotted line 82. It is noted that the lines 80, 82 intersect at point A which is the center of the wheel 18 on the ground. This occurs at design load condition. Dotted line 84 indicates the turning axis of the spindle 16 and is in line with the center of the spring seat 60. Thus, as the wheel 18 is turned or moves up and down the wheel load forces are transmitted directly to the spring 64 without tending to cock it.

The foregoing construction constitutes the preferred embodiment of the present invention. Other improvements and advantages may occur to those skilled in the art which will come within the scope and spirit of the following claims.

I claim:

1. In a suspension system for a vehicle, the combination comprising a pivotally mounted suspension arm and a wheel support spindle, said arm having a socket member pivotally secured thereto, said spindle having a ball seated in said socket, a pin interconnecting said ball and said socket, the axis of said pin being located perpendicular to the pivot axis of said socket member, a suspension spring interposed between a sprung vehicle part and an unsprung suspension part.

2. In a suspension system for a vehicle having sprung structure, the combination comprising a pivotally mounted suspension arm having a socket member pivotally secured thereto, a wheel support spindle having a ball seated in said socket, a spring seat carried by said socket, a suspension spring interposed between said seat and said sprung structure.

3. In a suspension system for a vehicle having sprung structure, the combination comprising a pivotally mounted suspension arm having a socket member pivotally secured thereto, a wheel support spindle having a ball seated in said socket, a spring seat carried by said socket, a suspension spring interposed between said seat and said sprung structure, a pin interconnecting said ball and said socket, the axis of said pin being located perpendicular to the pivot axis of said socket member.

4. In a suspension system for a vehicle having sprung structure, the combination comprising a pivotally mounted suspension arm having a socket member pivotally secured thereto, a wheel support spindle having a ball seated in said socket, said spindle having a wheel rotatably mounted thereon, a spring seat carried by said socket, a coil spring interposed between said seat and said sprung structure, a pin interconnecting said ball and said socket, the axis of said pin being located perpendicular to the pivot axis of said socket member, the axis of said coil spring intersecting the ground contact area of said wheel.

5. In a suspension system for a vehicle having sprung structure, the combination comprising pivotally mounted upper and lower suspension arms, said upper arm having a socket member pivotally secured thereto, a wheel supporting spindle having a ball member seated in said socket member, said lower arm being universally joined to said spindle, said socket having a vertical extension with a spring seat secured thereto, a coil spring interposed between said seat and said sprung structure, a pin interconnecting said ball and said socket member, the axis of said pin being located perpendicular to the pivot axis of said socket member.

6. In a suspension system for a vehicle having sprung structure, the combination comprising a pivotally mounted suspension arm and a wheel supporting spindle, an intermediate member interconnecting said arm and spindle, said member being pivotally connected to said arm by a pair of spaced apart bushings and to said spindle by pivot means interposed between said bushings, a spring seat carried by said member, a suspension spring interposed between said seat and said sprung structure.

7. The combination of claim 6 wherein the pivot axis of said bushings is substantially perpendicular to the pivot axis of said pivot means.

8. In a suspension system for a vehicle having a sprung part, the combination comprising a pivotally mounted suspension arm and a wheel supporting spindle, said arm having a socket assembly pivotally secured thereto, said spindle having a ball enclosed within said socket, and suspension spring interposed between a sprung vehicle part and said socket assembly.

References Cited in the file of this patent
UNITED STATES PATENTS

| | | |
|---|---|---|
| 1,742,782 | Parker | Jan. 7, 1930 |
| 2,085,738 | Coleman | July 6, 1937 |
| 2,117,588 | Armstrong | May 17, 1938 |
| 2,290,923 | Wahlberg | July 28, 1942 |
| 2,684,253 | Leighton | July 20, 1954 |
| 2,876,018 | Kishline et al. | Mar. 3, 1959 |
| 2,904,343 | Taber | Sept. 15, 1959 |